United States Patent
Harada et al.

(10) Patent No.: US 12,526,119 B2
(45) Date of Patent: Jan. 13, 2026

(54) TERMINAL AND BASE STATION

(71) Applicant: NTT DOCOMO, INC., Tokyo (JP)

(72) Inventors: Hiroki Harada, Tokyo (JP); Tomoya Ohara, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 386 days.

(21) Appl. No.: 17/759,144

(22) PCT Filed: Jan. 31, 2020

(86) PCT No.: PCT/JP2020/003834
§ 371 (c)(1),
(2) Date: Jul. 20, 2022

(87) PCT Pub. No.: WO2021/152864
PCT Pub. Date: Aug. 5, 2021

(65) Prior Publication Data
US 2022/0408489 A1    Dec. 22, 2022

(51) Int. Cl.
*H04W 74/0833* (2024.01)
*H04L 5/00* (2006.01)
*H04W 16/14* (2009.01)

(52) U.S. Cl.
CPC ........... *H04L 5/0094* (2013.01); *H04W 16/14* (2013.01); *H04W 74/0833* (2013.01)

(58) Field of Classification Search
None
See application file for complete search history.

(56) References Cited

U.S. PATENT DOCUMENTS

2019/0159265 A1 * 5/2019 Takeda .................. H04W 74/08
2019/0223228 A1 * 7/2019 Ko ......................... H04L 5/0053
2019/0306832 A1 * 10/2019 Si .......................... H04L 5/0082
(Continued)

FOREIGN PATENT DOCUMENTS

EP    3471364 A1    4/2019
EP    3793153 A1    3/2021
(Continued)

OTHER PUBLICATIONS

International Search Report for corresponding International Application No. PCT/JP2020/003834, mailed Aug. 18, 2020 (5 pages).
(Continued)

*Primary Examiner* — Benjamin Lamont
(74) *Attorney, Agent, or Firm* — Osha Bergman Watanabe & Burton LLP

(57) ABSTRACT

A terminal including a reception unit that receives configuration information in a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that configures at least one of a format of a random access preamble, a sequence of the random access preamble, a subcarrier spacing applied to a channel on which the random access preamble is to be transmitted, or a subcarrier spacing applied to an uplink shared channel, based on the configuration information.

7 Claims, 13 Drawing Sheets

(56) References Cited

U.S. PATENT DOCUMENTS

| | | | |
|---|---|---|---|
| 2019/0306923 A1* | 10/2019 | Xiong | H04J 13/0062 |
| 2020/0053785 A1* | 2/2020 | Kim | H04L 5/0007 |
| 2020/0092871 A1* | 3/2020 | Axnäs | H04W 74/0891 |
| 2020/0137792 A1* | 4/2020 | Yoon | H04W 74/0866 |
| 2020/0229244 A1* | 7/2020 | Yan | H04W 74/002 |

FOREIGN PATENT DOCUMENTS

| | | | |
|---|---|---|---|
| WO | 2018/084208 A1 | 5/2018 | |
| WO | 2019/198247 A1 | 10/2019 | |
| WO | 2019215918 A1 | 11/2019 | |

OTHER PUBLICATIONS

Written Opinion for corresponding International Application No. PCT/JP2020/003834, mailed Aug. 18, 2020 (3 pages).

Qualcomm; "New WID on Extending current NR operation to 71 GHz"; 3GPP TSG RAN Meeting #86, RP-193229; Sitges, Spain; Dec. 9-12, 2019 (5 pages).

3GPP TS 38.101-2 V15.8.0; "3rd Generation Partnership Project; Technical Specification Group Radio Access Network; NR; User Equipment (UE) radio transmission and reception; Part 2: Range 2 Standalone (Release 15)"; Dec. 2019 (144 pages).

Ericsson; "WF on the NR-U channel raster on 5GHz band"; 3GPP TSG-RAN4 Meeting #92bis, R4-1912870; Chongqing, China; Oct. 14-18, 2019 (10 pages).

Qualcomm Incorporated; "Draft CR channel raster in band n46 for NR-U operation"; 3GPP TSG-RAN WG4 #93, R4-1916167; Reno, United States; Nov. 18-22, 2019 (3 pages).

Qualcomm Incorporated; "WF for sync raster for NR-U"; 3GPP TSG-RAN WG4 Meeting #92bis, R4-1912982; Chongqing, China; Oct. 14-18, 2019 (4 pages).

Futurewei; "Draft CR for Sync raster design for NR-U in 38.104"; 3GPP TSG-RAN WG4 Meeting #93, R4-1915982; Reno, United States; Nov. 18-22, 2019 (3 pages).

3GPP TS 38.331 V15.8.0; "3rd Generation Partnership Project; Technical Specification Group Radio Access Network; NR; Radio Resource Control (RRC) protocol specification (Release 15)"; Dec. 2019 (532 pages).

3GPP TS 38.213 V15.8.0; "3rd Generation Partnership Project; Technical Specification Group Radio Access Network; NR; Physical layer procedures for control (Release 15)"; Dec. 2019 (109 pages).

Apple Inc.; "PRACH preamble for NR-U"; 3GPP TSG RAN WG1 Ad-Hoc Meeting 1901, R1-1900739; Taipei, Taiwan; Jan. 21-25, 2019 (7 pages).

Office Action issued in Japanese Patent Application No. 2021-574434, mailed on Feb. 13, 2024 (6 pages).

Ericsson; "URLLC Use Cases and Deployments for Beyond 52.6 GHz"; 3GPP TSG RAN WG1 Meeting #97, R1-1906112; Reno, Nevada, USA; May 13-17, 2019 (4 pages).

Extended European Search Report issued in European Application No. 20916809.5, mailed on Sep. 19, 2023 (8 pages).

Office Action issued in counterpart Japanese Patent Application No. 2021-574434 mailed on Jul. 30, 2024 (4 pages).

Ericsson; "Introduction of NR-based access to unlicensed spectrum"; 3GPP TSG-RAN WG1 Meeting #99, R1-1913630; Reno, Nevada, USA; Nov. 18-22, 2019 (3 pages).

Office Action issued in Chinese Patent Application No. 202080093807.8, dated Feb. 22, 2025 (14 pages).

* cited by examiner

FIG.3

Long sequence based (format 0/1/2/3): sequence length = 839

| Format | L | SCS (kHz) | BW (MHz) | N_OS | T_SEQ (Ts) | T_CP (Ts) | T_GP (Ts) | Use case |
|---|---|---|---|---|---|---|---|---|
| 0 (1 ms) | 839 | 1.25 | 1.08 | 1 | 24576 | 3168 | 2975 | LTE refarming |
| 1 (3 ms) | 839 | 1.25 | 1.08 | 2 | 2*24576 | 21024 | 21904 | Large cell, upto 100km |
| 2 (3.5 ms) | 839 | 1.25 | 1.08 | 4 | 4*24576 | 4688 | 4528 | Coverage enhancement |
| 3 (1 ms) | 839 | 5 | 4.32 | 4 | 4*6144 | 3168 | 2976 | High speed case |

FIG.4

Short sequence based (format A/B/C): sequence length =139

| Preamble format | | N_OS | T_CP (Ts) | T_SEQ (Ts) | T_GP (Ts) | Path profile (Ts) | Path profile (us) | Maximum Cell radius (meter) | Use case |
|---|---|---|---|---|---|---|---|---|---|
| A | 0 | 1 | 144 | 2048 | 0 | 48 | 1.56 | 469 | TA is already known or Very small cell |
| | 1 | 2 | 288 | 4096 | 0 | 96 | 3.13 | 938 | Small cell |
| | 2 | 4 | 576 | 8192 | 0 | 144 | 4.69 | 2,109 | Normal cell |
| | 3 | 6 | 864 | 12288 | 0 | 144 | 4.69 | 3,516 | Normal cell |
| B | 1 | 2 | 216 | 4096 | 72 | 96 | 3.13 | 469 | Small cell |
| | 2 | 4 | 360 | 8192 | 216 | 144 | 4.69 | 1,055 | Normal cell |
| | 3 | 6 | 504 | 12288 | 360 | 144 | 4.69 | 1,758 | Normal cell |
| | 4 | 12 | 936 | 24576 | 792 | 144 | 4.69 | 3,867 | Normal cell |
| C | 0 | 1 | 1240 | 2048 | 1096 | 144 | 4.69 | 5300 | Normal cell |
| | 2 | 4 | 2048 | 8192 | 2916 | 144 | 4.69 | 9200 | Normal cell |

FIG. 6

Table 6.3.3.2-1: Supported combinations of $\Delta f^{RA}$ and $\Delta f$, and the corresponding value of $\bar{k}$.

| $L_{RA}$ | $\Delta f^{RA}$ for PRACH | $\Delta f$ for PUSCH | $N_{RB}^{RA}$, allocation expressed in number of RBs for PUSCH | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |
| 571 | 30 | 15 | 96 | 2 |
| 571 | 30 | 30 | 48 | 2 |
| 571 | 30 | 60 | 24 | 2 |
| 1151 | 15 | 15 | 96 | 1 |
| 1151 | 15 | 30 | 48 | 1 |
| 1151 | 15 | 60 | 24 | 1 |
| 139 | 240 | 240 | 12 | 2 |
| 139 | 240 | 120 | 24 | 2 |
| 1151 | 240 | 240 | 96 | 1 |
| 1151 | 240 | 120 | 192 | 1 |

Rel-15 (rows 1–16), Rel-16 (NR-U) (rows 17–22)

FIG.7

| PRACH Config. Index | Preamble format | $n_{SFN} \bmod x = y$ | | Slot number | Starting symbol | Number of PRACH slots within a 60 kHz slot | | $N_t^{RA,slot}$, number of time-domain PRACH occasions within a PRACH slot | $N_{dur}^{RA}$, PRACH duration |
|---|---|---|---|---|---|---|---|---|---|
| | | $x$ | $y$ | | | PRACH SCS = 120 kHz | PRACH SCS = 240 kHz | | |
| 0 | A1 | 16 | 1 | 4, 9, 14, 19, 24, 29, 34, 39 | 0 | 2 | 4 | 6 | 2 |
| 1 | A1 | 16 | 1 | 3, 7, 11, 15, 19, 23, 27, 31, 35, 39 | 0 | 1 | 1 | 6 | 2 |
| 2 | A1 | 8 | 1, 2 | 9, 19, 29, 39 | 0 | 2 | 4 | 6 | 2 |
| 3 | A1 | 8 | 1 | 4, 9, 14, 19, 24, 29, 34, 39 | 0 | 2 | 4 | 6 | 2 |

Format with inserting CP for every PRACH OFDM symbol

Format with larger number of repetitions

Format with shorter CP (GP) duration

FIG.12

Table 6.3.3.2-4: Random access configurations for FR2 and unpaired spectrum.

| PRACH Config. Index | Preamble format | $n_{SFN} \mod x = y$ | | Slot number | Starting symbol | Number of PRACH slots within a 60 kHz slot | $N_t^{RA,slot}$, number of time-domain PRACH occasions within a PRACH slot | $N_{dur}^{RA}$, PRACH duration |
|---|---|---|---|---|---|---|---|---|
| | | $x$ | $y$ | | | | | |
| 0 | A1 | 16 | 1 | 4, 9, 14, 19, 24, 29, 34, 39 | 0 | 2 | 6 | 2 |
| 1 | A1 | 16 | 1 | 3, 7, 11, 15, 19, 23, 27, 31, 35, 39 | 0 | 1 | 6 | 2 |
| 2 | A1 | 8 | 1, 2 | 9, 19, 29, 39 | 0 | 2 | 6 | 2 |
| 3 | A1 | 8 | 1 | 4, 9, 14, 19, 24, 29, 34, 39 | 0 | 2 | 6 | 2 |
| .... | | | | | | | | |

FIG.13

Table 6.3.3.2-x: Random access configurations for FR2x and unpaired spectrum.

| PRACH Config. Index | Preamble format | $n_{SFN} \bmod x = y$ | | Slot number | Starting symbol | Number of PRACH slots within a 120 kHz slot | $N_t^{RA,slot}$, number of time-domain PRACH occasions within a PRACH slot | $N_{dur}^{RA}$, PRACH duration |
|---|---|---|---|---|---|---|---|---|
| | | $x$ | $y$ | | | | | |
| 0 | A1 | 16 | 1 | 4, 9, 14, 19, 24, 29, 34, 39, 44, 49, 54, 59, 64, 69, 74, 79 | 0 | 2 | 6 | 2 |
| 1 | A1 | 16 | 1 | 3, 7, 11, 15, 19, 23, 27, 31, 35, 39, 43, 47, 51, 55, 59, 63, 67, 71, 75, 79 | 0 | 1 | 6 | 2 |
| .... | | | | | | | | |

TERMINAL AND BASE STATION

TECHNICAL FIELD

The present invention relates to a terminal and a base station in a radio communication system.

BACKGROUND ART

In new ratio (NR) of Release 15 and NR of Release 16 of a third generation partnership project (3GPP), a frequency band up to the upper limit of 52.6 GHz is the target. With regard to extension of NR to a frequency band higher than or equal to 52.6 GHz, in Release 16, a study item exists at a technical specification group radio access network (TSG RAN) level in which various regulations, use cases, requirements, and the like are to be studied. The study of the study item has been completed in December 2019, and in Release 17, a study item and a work item for actually extending a technical specification to 52.6 GHz or higher have been agreed.

In the study item in Release 16, as an NR frequency band, extension from 52.6 GHz to 114.25 GHz was assumed, but in Release 17, time for the study is limited, and, thus, it is assumed that the frequency band to be studied is limited to a range from 52.6 GHz to 71 GHz. In addition, when extending the NR frequency band from 52.6 GHz to 71 GHz, it is assumed that extension is carried out on the basis of design of current NR frequency range 2 (FR2).

RELATED ART DOCUMENT

Non-Patent Document

Non-Patent Document 1: 3GPP TSG RAN Meeting #86, RP-193229, Sitges, Spain, Dec. 9 to 12, 2019
Non-Patent Document 2: 3GPP TS 38.101-2 V15.8.0 (2019-12)
Non-Patent Document 3: 3GPP TSG-RAN4 Meeting #92bis, R4-1912870, Chongqing, China, 14 to 18 Oct. 2019
Non-Patent Document 4: 3GPP TSG-RAN4 Meeting #93, R4-1916167, Reno, United States, 18 to 22 Nov. 2019
Non-Patent Document 5: 3GPP TSG-RAN4 Meeting #92bis, R4-1912982, Chongqing, China, 14 to 18 Oct. 2019
Non-Patent Document 6: 3GPP TSG-RAN4 Meeting #93, R4-1915982, Reno, US, Nov. 18 to 22, 2019
Non-Patent Document 7: 3GPP TS 38.331 V15.8.0 (2019-12)
Non-Patent Document 8: 3GPP TS 38.213 V15.8.0 (2019-12)

SUMMARY OF THE INVENTION

Problem to be Solved by the Invention

It is expected that a new subcarrier spacing will be introduced in the frequency band from 52.6 GHz to 71 GHz.

There is a need for a technique that enables a terminal to appropriately make a configuration for transmitting a random access preamble in a high frequency band higher than or equal to the FR2 frequency band for NR.

Means for Solving the Problem

According to an aspect of the invention, there is provided a terminal including a reception unit that receives configuration information in a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that configures at least one of a format of a random access preamble, a sequence of the random access preamble, a subcarrier spacing applied to a channel on which the random access preamble is to be transmitted, or a subcarrier spacing applied to an uplink shared channel, based on the configuration information.

Advantage of the Invention

According to an embodiment, a technique is provided that enables the terminal to appropriately make the configuration for transmitting the random access preamble in a high frequency band higher than or equal to the FR2 frequency band for NR.

BRIEF DESCRIPTION OF DRAWINGS

FIG. 3 is a diagram illustrating an example of a PRACH format based on a long sequence of Release 15 NR.

FIG. 4 is a diagram illustrating an example of a PRACH format based on a short sequence of Release 15NR.

FIG. 6 is a diagram illustrating an example of a combination of a sequence length applied to a PRACH format, a PRACH SCS and a PUSCH SCS.

FIG. 7 is a diagram illustrating an example of a table newly introduced for a frequency band from 52.6 GHz to 71 GHz.

FIG. 12 is a diagram illustrating an example of a table that defines the correspondence between a PRACH configuration and a PRACH configuration index applicable to FR2.

FIG. 13 is a diagram illustrating an example of introducing a new value of a parameter into a table.

EMBODIMENTS OF THE INVENTION

Hereinafter, an embodiment of the invention will be described with reference to the accompanying drawings. Note that, the following embodiment is illustrative only, and embodiments to which the invention is applied are not limited to the following embodiments.

It is assumed that a radio communication system in the following embodiments basically conform to NR, but this is merely an example, and the radio communication system in the embodiments may partially or entirely conform to a radio communication system (for example, LTE) other than the NR.

(Overall System Configuration)

Figure 1:
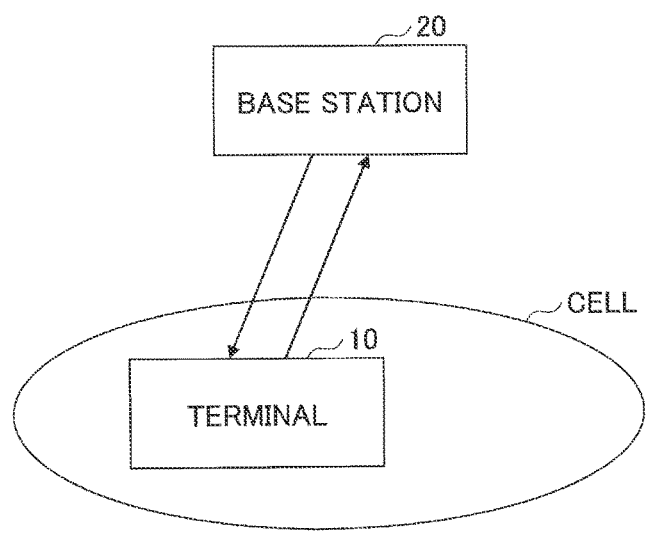
FIG. 1 is a configuration diagram of a communication system in an embodiment.

FIG. 1 illustrates a configuration diagram of the radio communication system according to the embodiments. As illustrated in FIG. 1, the radio communication system according to the embodiments includes a terminal 10 and a base station 20. In FIG. 1, one piece of the terminal 10 and one piece of the base station 20 are illustrated, but this is an example, and a plurality of the terminals 10 and a plurality of the base stations 20 may be provided.

The terminal 10 is a communication device such as a smart phone, a portable telephone, a tablet, a wearable terminal, and a communication module for machine-to-machine (M2M) which have a radio communication function. The terminal 10 receives a control signal or data from the base station 20 in DL, and transmits the control signal or the data to the base station 20 in UL to use various communication services provided by the radio communication system. For example, a channel transmitted from the terminal 10 includes a physical uplink control channel (PUCCH) and a physical uplink shared channel (PUSCH). In addition, the terminal 10 may be referred to as a UE, and the base station 20 may be referred to as a gNB.

In the embodiments, a duplex method may be a time division duplex (TDD) method or a frequency division duplex (FDD) method.

In addition, in the embodiment, with regard to description of "a radio parameter or the like is configured", a predetermined value may be pre-configured, or may be configured on the basis of a radio parameter indicated by the base station 20 or the terminal 10.

The base station 20 is a communication device that provides one or more cells and that performs radio communication with the terminal 10. Physical resources of a radio signal are defined in a time domain and a frequency domain, the time domain may be defined by a number of OFDM symbols, and the frequency domain may be defined by a number of sub-carriers or a number of resource blocks. The base station 20 transmits synchronization signals and system information to the terminal 10. The synchronization signals are, for example, NR-PSS and NR-SSS. A part of the system information is transmitted, for example, by NR-PBCH, and is also called broadcast information. The synchronization signal and broadcast information may be periodically transmitted as an SS block (SS/PBCH block) formed of a predetermined number of OFDM symbols. For example, the base station 20 transmits a control signal or data in Downlink (DL) to the terminal 10 and receives a control signal or data in Uplink (UL) from the terminal 10. Both the base station 20 and the terminal 10 are capable of beam forming to transmit and receive signals. For example, a reference signal transmitted from the base station 20 includes a Channel State Information Reference Signal (CSI-RS) and a channel transmitted from the base station 20 includes a Physical Downlink Control Channel (PDCCH) and a Physical Downlink Shared Channel (PDCCH).

(Multi-Numerology)

In order to support a wide range of frequencies and use cases in 5G, it is necessary to support multiple numerologies (radio parameters such as a subcarrier spacing and a symbol length). Accordingly, it is effective to design variable parameters in a scalable manner on the basis of LTE numerology. Based on this idea, Multi-Numerology of NR has been introduced. Specifically, the reference subcarrier spacing is the same as the LTE subcarrier spacing, and is set to 15 kHz. Other subcarrier spacings are defined by multiplying the reference subcarrier spacing by a power of 2. A plurality of subcarrier spacing configurations p are defined. Specifically, for $\mu=0$, the subcarrier spacing $\Delta f=15$ kHz and Cyclic prefix=Normal may be specified; for $\mu=1$, the subcarrier spacing $\Delta f=30$ kHz and Cyclic prefix=Normal may be specified; for $\mu=2$, the subcarrier spacing $\Delta f=60$ kHz and Cyclic prefix=Normal or Extended may be specified; for $\mu=3$, the subcarrier spacing $\Delta f=120$ kHz and Cylic prefix=Normal may be specified; and for $\mu=4$, the subcarrier spacing $\Delta f=240$ kHz and Cyclic prefix=Normal may be specified.

The number of OFDM symbols included in one slot is set to 14 for any of the subcarrier spacing configurations $\mu=0$, 1, 2, 3, and 4. However, for the subcarrier spacing configurations $\mu=0$, 1, 2, 3, and 4, the number of slots included in one frame is set to 10, 20, 40, 80, and 160, and the number of slots included in one sub-frame is set to 1, 2, 4, 8, and 16. Here, since the frame length is 10 ms, for the subcarrier spacing configurations $\mu=0$, 1, 2, 3, and 4, the slot lengths are set to 1 ms, 0.5 ms, 0.25 ms, 0.125 ms, and 0.625 ms. Since the number of OFDM symbols included in one slot is set to 14 for any of the subcarrier spacing configurations $\mu=0$, 1, 2, 3, and 4, the OFDM symbol lengths differ for every subcarrier spacing configurations. For the subcarrier spacing configurations $\mu=0$, 1, 2, 3, and 4, the OFDM symbol lengths are set to (1/14) ms, (0.5/14) ms, (0.25/14) ms, (0.125/14) ms and (0.0625/14) ms. As described above, by shortening the slot length and the OFDM symbol length, low-latency communication can be achieved. For example, the base station 20 can configure the subcarrier spacing for the terminal 10 by specifying any of $\mu=0$, 1, 2, 3, and 4 in a subcarrier spacing that is a parameter of an information element BWP.

(Extension of NR to Frequency Band Higher than or Equal to 52.6 GHz)

Under the new radio (NR) Release 15 and the NR Release 16 of the third generation partnership project (3GPP), a frequency band up to the upper limit of 52.6 GHz is the target. With regard to extension of the NR to a frequency band higher than or equal to 52.6 GHz, in Release 16, a study item exists at a technical specification group radio access network (TSG RAN) level in which various regulations, use cases, requirements, and the like are examined. The study of the study item was completed in December 2019, and in Release 17, a study item and a work item for actually extending a technical specification to 52.6 GHz or higher have been agreed.

Figure 2:
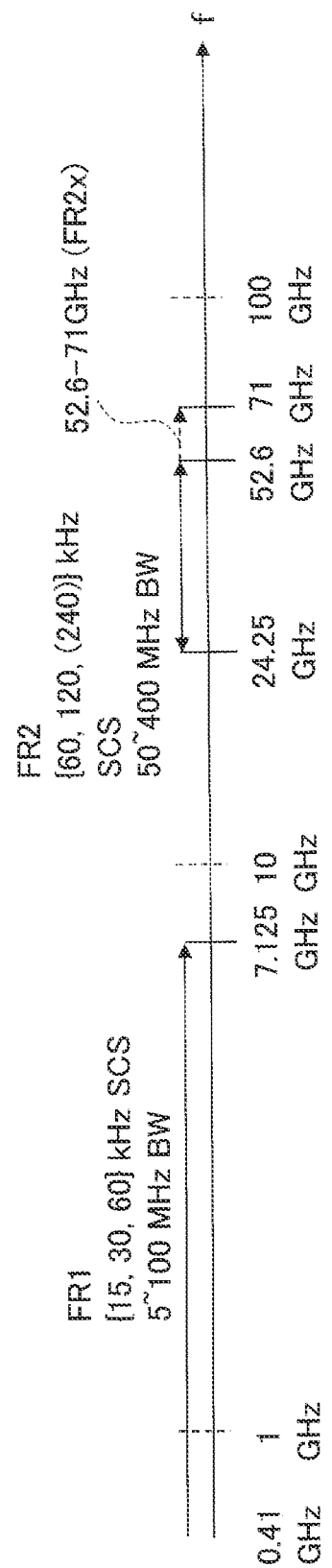
FIG. 2 is a diagram illustrating an example of extension of a frequency band of NR.

In the study items in Release 16, as an NR frequency band, extension from 52.6 GHz to 114.25 GHz was assumed, but in Release 17, time for the study is limited, and, thus, it is assumed that the frequency band to be studied is limited to a range from 52.6 GHz to 71 GHz as illustrated in FIG. 2. In addition, when extending the NR frequency band from 52.6 GHz to 71 GHz, it is assumed that extension is carried out on the basis of design of current NR frequency range 2 (FR2). The reason for this is because it is assumed that a considerable amount of time will be spent to conduct an examination on a new wave form.

In addition, the reason for limiting the frequency band to be studied to the range from 52.6 GHz to 71 GHz is as follows. For example, in a frequency band of 71 GHz or lower, a frequency band of 54 GHz to 71 GHz already exists as an unlicensed frequency band available for use in each country. In addition, at a word radio communication conference 2019 (WRC-2019), as a candidate for new frequency band for international mobile telecommunication (IMT), a frequency band from 66 GHz to 71 GHz is the highest frequency band. Thus, no frequency band higher than or equal to 71 GHz is available for use as a licensed band.

Current NR frequency bands include frequency range 1 (FR1), which corresponds to a frequency band of 410 MHz to 7.125 GHz, and FR2, which corresponds to a frequency band of 24.25 GHz to 52.6 GHz.

Note that, with regard to the frequency band of 52.6 GHz to 71 GHz, the definition of the current FR2 (frequency band of 24.25 GHz to 52.6 GHz) may be modified, and the frequency band may be included in a modified FR2, or may be defined as a new frequency range (FR) separately from the FR2.

(Objectives of Work Item)
(RAN1: Feature of Physical Layer)

One or a plurality of new numerologies for the terminal 10 and the base station 20 to operate in a frequency band of 52.6 GHz to 71 GHz. In a case where an influence on a physical signal/channel specified in a study item (SI), a countermeasure is taken for the influence.

Features related to the timeline suitable for each new numerology. For example, preparing time and calculation time for each of bandwidth part (BWP) and beam switching time, hybrid automatic repeat request (HARQ) scheduling, user equipment (UE) processing, physical downlink shared channel (PDSCH), physical uplink shared channel (PUSCH)/sounding reference signal (SRS), and channel state information (CSI).

Up to 64 synchronization signal block (SSB) beams for an operation in a licensed frequency band and an operation in an unlicensed frequency band in a frequency band of 52.6 GHz to 71 GHz.

The physical layer processing may include a channel access mechanism that expects a beam-based operation to meet regulatory requirements applicable to the unlicensed frequency band from 52.6 GHz to 71 GHz.

FIG. 3 and FIG. 4 are diagrams that illustrate an outline of a Physical Random Access Channel (PRACH) for NR in Release 15.

FIG. 3 is a diagram illustrating an example of a PRACH format based on a long sequence (Long sequence) according to Release 15 NR. The PRACH format based on the long sequence is a PRACH format for transmitting a Zadoff-Chu sequence having a sequence length of 839, and is a format similar to the PRACH format supported in LTE.

FIG. 4 is a diagram illustrating an example of a PRACH format based on a short sequence (Short sequence) for NR in Release 15. The PRACH format based on the short sequence is a PRACH format for transmitting a Zadoff-Chu sequence having a sequence length of 139. The PRACH format based on the short sequence can be used for in a case of using a wider bandwidth and shorter time length PRACH, for example, by using the same subcarrier spacing as a subcarrier spacing applied to data such as a PUSCH. For the PRACH format based on the short sequence, it is possible to use 15 kHz SCS, 30 kHz SCS, 60 kHz SCS, and 120 kHz SCS, similar to the subcarrier spacing (SCS: Subcarrier Spacing) applied to the data. In the FR1, it is possible to use 15 kHz SCS and 30 kHz SCS for the PRACH format based on the short sequence. Furthermore, in the FR2, it is possible to use 60 kHz SCS and 120 kHz SCS for the PRACH format based on the short sequence.

As shown in a table of FIG. 4, preamble formats A, B, and C are defined for the PRACH formats based on the short sequence. The preamble formats A, B, and C are mainly classified according to the presence or absence of a guard period (GP) and whether the length (duration) of a cyclic prefix (CP) is relatively long. For example, indexes 0, 1, 2, 3, and 4 are defined for the preamble formats A, B, and C, and the indexes indicate the difference in time length (duration). For example, "0" is the length of one symbol, "1" is the length of two symbols, "2" is the length of four symbols, "3" is the length of six symbols, and "4" is the length of 12 symbols.

As illustrated in FIG. 4, the guard period (T_GP) is set to 0 for the preamble format A. As a use case of the preamble format A, for example, it is expected that preamble formats A are arranged side by side to fill a slot and the preamble formats A are transmitted. The guard period (T_GP) is defined as non-zero for the preamble formats B and C. Accordingly, as a use case of the preamble formats B and C, for example, it is expected that the formats are used alone. A cyclic prefix length (T_CP) of the preamble format B differs from a cyclic prefix length (T_CP) of the preamble format C. The length of the cyclic prefix of the preamble format B is shorter than the length of the cyclic prefix of the preamble format C, and a maximum cell radius (Maximum Cell radius) corresponding to the preamble format B is smaller than the maximum cell radius corresponding to the preamble format C. That is, the preamble format B is expected to be used in relatively small cells, and the preamble format C is expected to be used in relatively large cells. Thus, it can be said that the preamble formats A, B, and C are classified according to the preamble use cases.

In the FR2 of Release 15 NR, it is possible to use only the PRACH format based on the short sequence, and it is possible to use the subcarrier spacing of 60 kHz or 120 kHz for the PRACH.

The PRACH format has been extended for a NR-U (unlicensed frequency band) in Release 16. In the NR-U in Release 16, all PRACH formats based on the short sequences for NR in Release 15 are available. In addition, the Zadoff-Chu sequence having a sequence length of 1151 (for 15 kHz SCS) and the Zadoff-Chu sequence having a sequence length of 571 (for 30 kHz SCS) are applicable to the formats A, B, and C.

Figure 5:
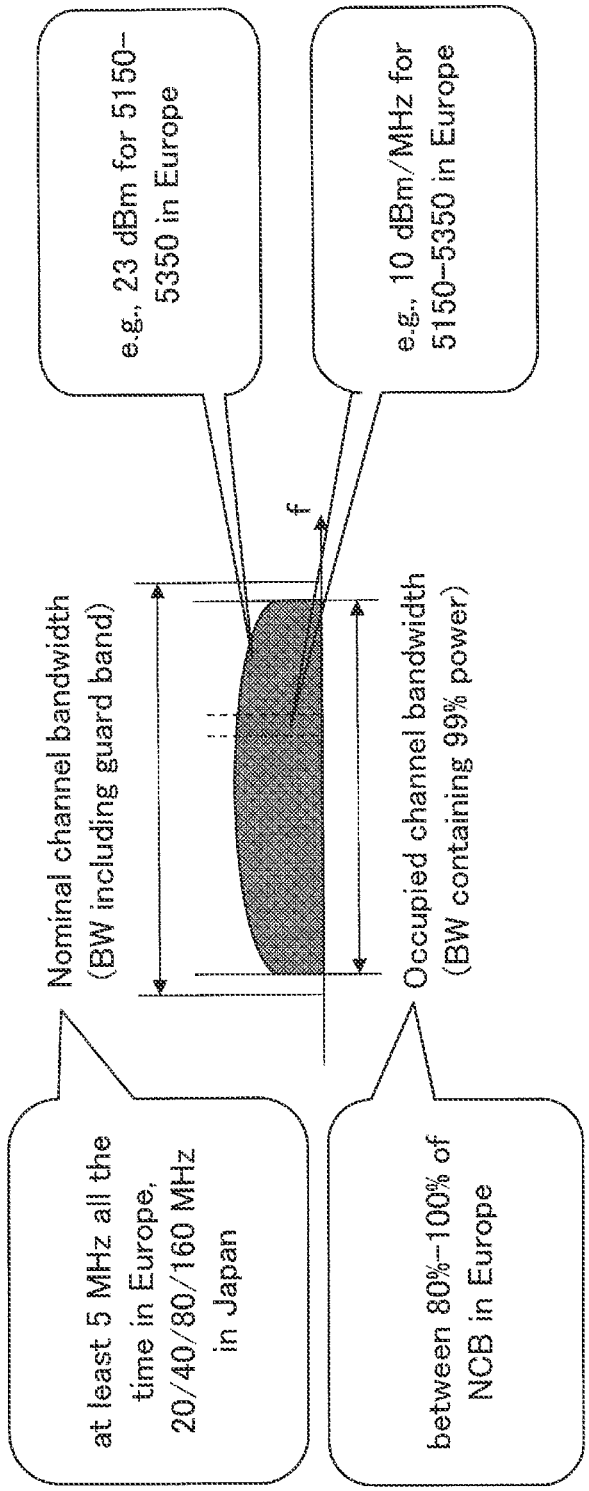
FIG. 5 is a diagram illustrating an example of a requirement for an occupied channel bandwidth (OCB) and an example of a requirement for a power spectral density (PSD).

FIG. 5 is a diagram illustrating an example of a requirement for an occupied channel bandwidth (OCB) and an example of a requirement for a power spectral density (PSD). In Europe, the use of radio waves in the unlicensed frequency band is regulated based on the requirement for the OCB. The rule is that 80% or more of the system bandwidth must be used when transmitting a signal. In the Zadoff-Chu sequence having a sequence length of 139 in Release 15, it is difficult to meet the requirement for the OCB because the band is too narrow. For this reason, the above-mentioned Zadoff-Chu sequence having the sequence length of 1151 and the Zadoff-Chu sequence having the sequence length of 571 have been introduced.

Furthermore, in Europe, the use of radio waves in the unlicensed frequency band is regulated in each country based on the upper limit of the power spectrum density (PSD), in addition to the requirement for the OCB. For example, in Europe, there is a rule that the frequency band from 5150 MHz to 5350 MHz shall be less than or equal to 10 dBm/MHz. Under such requirement for the OCB and requirement for the upper limit of the PSD, if the bandwidth for transmitting a signal is widened, it is possible to transmit the signal by increasing its total power, but if the bandwidth for transmitting the signal is narrowed, it is difficult to transmit the signal by increasing its total power. For this reason, the Zadoff-Chu sequence, which has a longer sequence length, has been introduced.

(Problem)

It is expected that a new subcarrier spacing will be introduced for the SSB and data in the frequency band from 52.6 GHz to 71 GHz. In this case, at this time, a subcarrier spacing available for the PRACH is unclear. For example, it is considered that the same subcarrier spacing as that applied to the data may be applied to the PRACH format based on the short sequence.

Furthermore, the requirements for the OCB are not applied to the unlicensed frequency band in the frequency band from 52.6 GHz to 71 GHz, but the requirements for the upper limit of the PSD are applied to the unlicensed frequency band in the frequency band from 52.6 GHz to 71 GHz. Thus, when a signal is transmitted on a narrow bandwidth, the transmission power for transmitting the signal is considered to be small. Accordingly, it is expected that it is necessary to increase the total transmission power for transmitting the signal by securing a wider bandwidth as the bandwidth for transmitting the signal.

(Proposal 1)

In the frequency band from 52.6 GHz to 71 GHz (including licensed and unlicensed frequency bands), a new numerology may be introduced for at least one of the preamble formats A, B, and C of the PRACH formats (the new numerology may be such that, for example, for $\mu=5$, the subcarrier spacing $\Delta f=480$ kHz and Cyclic prefix=Normal or Extended are specified. Alternatively, a new numerology may be such that, for example, for the existing $\mu=4$, the Extended is specified in addition to Normal. Note that, for each value of $\mu$, information other than the subcarrier spacing $\Delta f$ and the Cyclic prefix (for example, information on a frequency) may be specified.). For example, 240 kHz SCS and/or 480 kHz SCS may be applicable to the preamble formats A, B, and/or C with an orthogonal sequence (for example, Zadoff-Chu sequence) having a sequence length of 139.

In the licensed and unlicensed frequency bands, the orthogonal sequence having the same sequence length may be applied to the PRACH format, or the orthogonal sequence having a different sequence length may be applied to the PRACH format. For example, in the frequency band from 52.6 GHz to 71 GHz, the sequence length applicable to the PRACH format may be any one of the following Alt. 1 to Alt. 5.

(Alt. 1)

In the licensed and unlicensed frequency bands, it may be possible to apply an orthogonal sequence having a sequence length of 139 to a PRACH format, and to apply an orthogonal sequence having a sequence length of 571 and/or an orthogonal sequence having a sequence length of 1151 to a PRACH format.

(Alt. 2)

In the licensed frequency band, it may be possible to apply an orthogonal sequence having a sequence length of 139 to a PRACH format, and in the unlicensed frequency band, it may be possible to apply an orthogonal sequence having a sequence length of 571 and/or an orthogonal sequence having a sequence length of 1151 to a PRACH format. Furthermore, in the licensed frequency band, it may be possible to apply an orthogonal sequence having a sequence length of 139 to a PRACH format, and in the unlicensed frequency band, it may be possible to apply an orthogonal sequence having a sequence length of 139, and at least one of an orthogonal sequence having a sequence length of 571 and an orthogonal sequence having a sequence length of 1151 to a PRACH format.

(Alt. 3)

In the licensed and unlicensed frequency bands, it may be possible to apply an orthogonal sequence having a sequence length of 139 to a PRACH format, and it may be possible to apply an orthogonal sequence having a new sequence length (sequence length longer than 139) to a PRACH format.

(Alt. 4)

In the licensed frequency band, it may be possible to apply an orthogonal sequence having a sequence length of 139 to a PRACH format, and in the unlicensed frequency band, it may be possible to apply an orthogonal sequence having a new sequence length (sequence length longer than 139) to a PRACH format.

(Alt. 5)

In the licensed frequency band, it may be possible to apply an orthogonal sequence having a new sequence length (sequence length shorter than 139) to the PRACH format, and in the unlicensed frequency band, it may be possible to apply orthogonal sequence(s) having sequence length(s) of 139, 571 and/or 1151, and/or an orthogonal sequence having a new sequence length (sequence length longer than 139) to the PRACH format.

The sequence length used for the PRACH format may be determined based on the numerology (e.g., the subcarrier spacing), or regardless of which value of the multiple numerologies (e.g., the subcarrier spacings), the sequence length used for the PRACH format may be determined.

When a new orthogonal sequence is introduced, as in the above example, it may be necessary for the base station 20 to indicate, to the terminal 10, a sequence length to be applied to transmit the PRACH. Accordingly, a parameter may be added that indicates which candidate value can be selected from among the candidate values for a root sequence index having a new sequence length for the configuration information related to the PRACH received from the base station 20 (for example, the information element prach-RootSequenceIndex).

FIG. 6 is a diagram illustrating an example of a combination of a sequence length applied to a PRACH format, a PRACH SCS, and a PUSCH SCS. For example, in addition to a combination of the sequence length, the PRACH SCS, and the PUSCH SCS applicable to the PRACH format of 3GPP Release 15 NR, and a combination of the sequence length, the PRACH SCS, and the PUSCH SCS applicable to the PRACH format for NR-U in 3GPP Release 16, a combination of a sequence length, a PRACH SCS, and a PUSCH SCS applicable to the PRACH format may be added in the frequency band from 52.6 GHz to 71 GHz. In this case, the new combination to be added may include a combination in which the sequence length is 139 and the PRACH SCS and the PUSCH SCS are the same. Additionally, the new combination to be added may include a combination in which the PRACH SCS is wider than the PUSCH SCS, and a combination in which the PUSCH SCS is wider than the PRACH SCS. Alternatively, the new combination to be added may include only a combination in which the PUSCH SCS and the PRACH SCS are the same.

Note that, in the example of FIG. 6, $L_{RA}$ may indicate the length of the sequence, $\Delta f^{RA}$ for PRACH may indicate the subcarrier spacing for PRACH, and $\Delta f$ for PUSCH may indicate the subcarrier spacing for PUSCH. $N^{RA}_{RB}$ may indicate a value of the number of resource blocks used for PRACH transmission expressed by the number of resource blocks for PUSCH. $\tilde{K}$ may indicate a parameter used to generate a PRACH.

Operation Example 1

For example, in the frequency band from 52.6 GHz to 71 GHz, at the time of an initial access, the terminal 10 receives system information including PRACH configuration information from the base station 20. The terminal 10 selects an orthogonal sequence applicable to the PRACH format based on the parameter specified by the information element prach-RootSequenceIndex included in the received PRACH configuration information. Furthermore, the terminal 10 configures the subcarrier spacing for PRACH and configures the subcarrier spacing for PUSCH based on the PRACH configuration information included in the received system information. The terminal 10 applies the selected PRACH format and the subcarrier spacing for the PRACH, and the terminal 10 transmits a random access preamble to the base station 20.

(Proposal 2)

The frequency band to which (A) a new subcarrier spacing, (B) a new sequence length, and (C) a combination of a sequence length, a PRACH SCS, and a PUSCH SCS can be applied may be a predetermined frequency band. For example, the predetermined frequency band may be any of the following Alt. A1 to Alt. A4.

(Alt. A1)

It may be applicable only in the frequency band from 52.6 GHz to 71 GHz.

(Alt. A2)

It may be applicable in the frequency band from 24.25 GHz to 71 GHz.

(Alt. A3)

A part (or all) of the above (A), (B), and (C) may be applicable to the unlicensed frequency band of the frequency band from 52.6 GHz to 71 GHz, and a part (or all) of the above (A), (B), and (C) may be applicable to the licensed frequency band of the frequency band from 52.6 GHz to 71 GHz.

(Alt. A4)

A part (or all) of the above (A), (B), and (C) is applicable to the unlicensed frequency band of the frequency band from 24.25 GHz to 71 GHz, and a part (or all) of the above (A), (B), and (C) may be applicable to the licensed frequency band of the frequency band from 24.25 GHz to 71 GHz.

FIG. 12 is a diagram illustrating an example of a table that defines the correspondence between a PRACH configuration applicable to the FR2 and a PRACH configuration index.

(Alt. B1)

The table that defines the correspondence between the PRACH configuration applicable to the FR2 and the PRACH configuration index, as illustrated in the example of FIG. 12, may be applied to the frequency band from 52.6 GHz to 71 GHz. In this case, for example, formats A0, A1, A2, A3, B1, B2, B3, B4, C0, and C2 may be applicable as preamble formats, and the sequence length of the orthogonal sequence may be 139, 511, or 1151.

In the example of FIG. 12, when the PRACH SCS is 120 kHz, there are two PRACH slots within a 60 kHz slot. The value in the column of "Number of PRACH slots within a 60 kHz slot" in the example of FIG. 12 being one may indicate that there is a resource capable of actually transmitting the PRACH in only one PRACH slot in the latter half of the two PRACH slots within the 60 kHz slot. In addition, the value in the column of "Number of PRACH slots with a 60 kHz slot" being 2 may indicate that there is a resource capable of actually transmitting the PRACH in each slot of the two PRACH slots within the 60 kHz slot. In this regard, when the PRACH SCS is 240 kHz, there are four PRACH slots within the 60 kHz slot. In this case, for example, when the value in the column of "Number of PRACH slots within a 60 kHz slot" illustrated in the example of FIG. 12 is 2, the specified two slots of the four PRACH slots may be unknown.

Accordingly, in the table that defines the correspondence between the PRACH configuration and the PRACH configuration index, as illustrated in the example of FIG. 12, when the PRACH SCS is larger (for example, when the PRACH SCS is 240 kHz), "Number of PRACH slots within a 60 kHz slot" may be defined as any of the following Alt. C1 to Alt. C3. Note that, in addition to the following Alt. C1 to Alt. C3, when the value in the column of "Number of PRACH slots within a 60 kHz slot" is 2, there may be resources capable of actually transmitting the PRACH in all of the four PRACH slots within the 60 kHz slot.

(Alt. C1)

When the value in the column of "Number of PRACH slots within a 60 kHz slot" is 2, there may be resources capable of actually transmitting the PRACH in 3rd and 4th slots of the four PRACH slots within the 60 kHz slot.

(Alt. C2)

When the value in the column of "Number of PRACH slots within a 60 kHz slot" is 2, there may be resources capable of actually transmitting the PRACH in 2nd and 4th slots of the four PRACH slots within the 60 kHz slot.

(Alt. C3)

Either of the above Alt. C1 and Alt. C2 may be configurable by RRC signaling. That is, when the value in the column of "Number of PRACH slots within a 60 kHz slot" is 2, the base station 20a may configure a resource capable of actually transmitting the PRACH for any of the four PRACH slots within the 60 kHz slot, and may indicate the configuration information to the terminal 10 by the RRC signaling.

As described above, when the number of PRACH slots included in the slot as a unit is greater than 2, the PRACH slot specified by the PRACH configuration index illustrated in the example of FIG. 12 may be defined.

(Alt. B2)

A new table may be introduced that defines the correspondence between the PRACH configuration and the PRACH configuration index for the frequency band from 52.6 GHz to 71 GHz. FIG. 7 is a diagram illustrating an example of a table newly introduced for the frequency band from 52.6 GHz to 71 GHz.

(Opt. 1)

Only some of the formats A0, A1, A2, A3, B1, B2, B3, B4, C0, and C2 may be supported for the frequency band from 52.6 GHz to 71 GHz.

Figure 8:
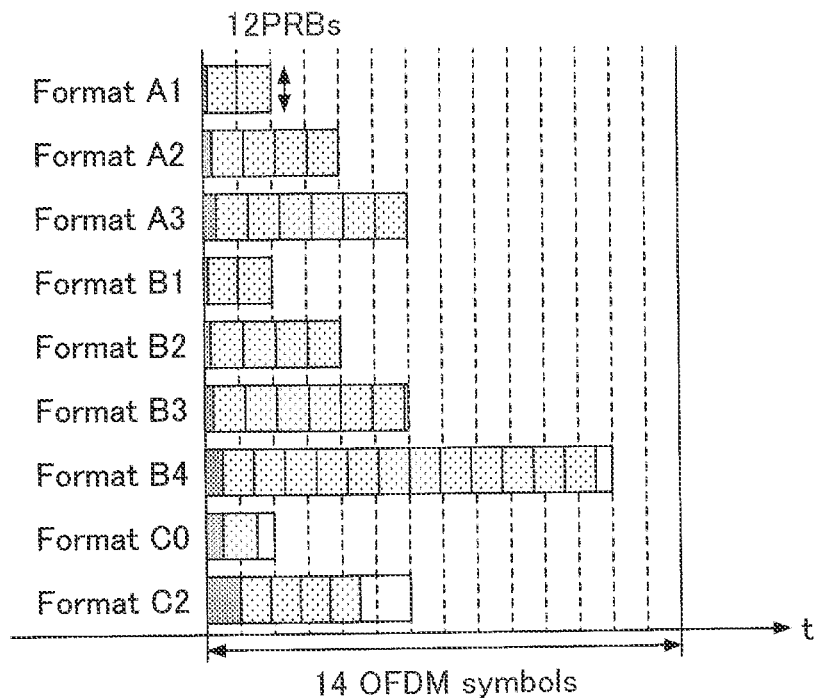
FIG. 8 is a diagram illustrating an example of formats A0, A1, A2, A3, B1, B2, B3, B4, C0, and C2.

FIG. 8 is a diagram illustrating an example of formats A0, A1, A2, A3, B1, B2, B3, B4, C0, and C2. For example, in the frequency band from 52.6 GHz to 71 GHz, it is expected that the cell size is set to be small, and, thus, C0 and C2 corresponding to long guard periods need not be supported. Furthermore, for example, A0, A1, A2, and A3, which do not include a guard period, need not be supported because these formats take time to switch the beam. For example, only B1, B2, B3, and B4 from among the formats A0, A1, A2, A3, B1, B2, B3, B4, C0, and C2 may be supported.

(Opt. 2)

A new format may be introduced for the frequency band from 52.6 GHz to 71 GHz.

Figure 9:
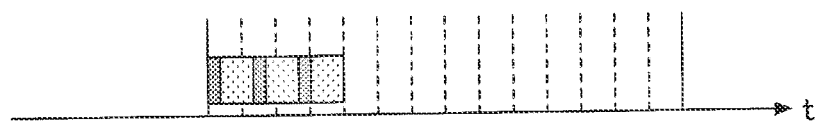
FIG. 9 is a diagram illustrating an example of a format in which a cyclic prefix is inserted per OFDM symbol of a PRACH.

For example, in the frequency band from 52.6 GHz to 71 GHz, a format, which corresponds to the switching of a transmission beam in the base station 20, may be introduced in which a cyclic prefix is inserted per PRACH OFDM symbol. FIG. 9 is a diagram illustrating an example of a format in which a cyclic prefix is inserted per PRACH OFDM symbol.

Figure 10:
FIG. 10 is a diagram illustrating an example of a format with a larger number of repetitions of a PRACH OFDM symbol.

Furthermore, for example, for the frequency band from 52.6 GHz to 71 GHz, a format may be introduced in which PRACH OFDM symbols are repeated many times for the purpose of improving coverage. FIG. 10 is a diagram illustrating an example of a format with a larger number of repetitions of the PRACH OFDM symbol.

Figure 11:
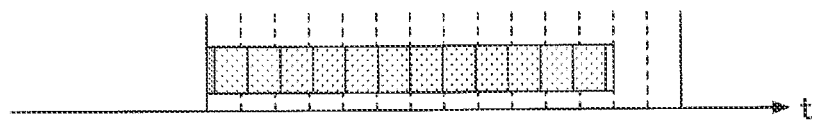
FIG. 11 is a diagram illustrating an example of a format with a shorter cyclic prefix (or guard period) duration.

In addition, for example, for the frequency band from 52.6 GHz to 71 GHz, a format may be introduced in which the cyclic prefix (or the guard period) has a short duration. FIG. 11 is a diagram illustrating an example of a format with a shorter cyclic prefix (or a guard period) duration.

(Opt. 3)

A new value of the parameter may be introduced into the table that defines the correspondence between the PRACH configuration and the PRACH configuration index for the frequency band from 52.6 GHz to 71 GHz.

FIG. 13 is a diagram illustrating an example of introducing a new value of a parameter into a table. For example, as illustrated in the example of the table in FIG. 13, Slot numbers 44, 49, 54, 59, 64, 69, 74, and 70 may be newly added. Furthermore, with respect to "Number of PRACH slots", the number of PRACH slots in the slots corresponding to the new subcarrier spacing may be added, such as "Number of PRACH slots within a 120 kHz slot."

(Alt. B3)

The table that defines the correspondence between the PRACH configuration and the PRACH configuration index applicable to the FR2, as illustrated in the example of FIG. 12, may be changed for the frequency band from 52.6 GHz to 71 GHz and the changed table may be applied to the frequency band from 52.6 GHz to 71 GHz.

FIG. 7 is a diagram illustrating an example in which the table for the FR2 is changed for the frequency band from 52.6 GHz to 71 GHz. In the example of FIG. 7, a column of the PRACH SCS=240 kHz is added to the column of "Number of PRACH slots within a 60 kHz slot" in addition to the column of the PRACH SCS=120 kHz. Noted that, in the example of FIG. 7, 120 kHz SCS and 240 kHz SCS are described, but this is an example, and there may be another plurality of SCSs such as 120 kHz and 480 kHz.

Operation Example 2

For example, in the frequency band from 52.6 GHz to 71 GHz, at the time of an initial access, the terminal 10 receives system information including PRACH configuration information from the base station 20. The terminal 10 configures a PRACH configuration associated with a value of a PRACH configuration index based on the value of the PRACH configuration index included in the received PRACH configuration information, and transmits a random access preamble to the base station 20. Here, the PRACH configuration associated with the value of the PRACH configuration index may be any of Alt. B1 to Alt. B3.

(UE Capability)

The terminal 10 may transmit capability information regarding the applicability of the PRACH format (for example, capability information indicating whether all (or some) PRACH formats (including the sequence length and/or SCC) applicable to the frequency band from 52.6 GHz to 71 GHz can be applied) to the base station, and the base station may transmit configuration information regarding PRACH (configuration information as described in Proposal 1 and/or 2) to the terminal 10 based on this capability information.

(Alt. D1)

It may be possible to apply all PRACH formats (including sequence length and/or SCS) applicable to the frequency band from 52.6 GHz to 71 GHz to a terminal 10 that supports the frequency band from 52.6 GHz to 71 GHz.

(Alt. D2)

It may be possible to apply all PRACH formats (including sequence length and/or SCS) applicable to the frequency band from 52.6 GHz to 71 GHz to a terminal 10 that is able to operate in the unlicensed frequency band of the frequency band from 52.6 GHz to 71 GHz.

In this regard, it may not be possible to apply a PRACH format (e.g., sequence length 1151 or 571) applicable to a terminal 10 that supports an operation in the unlicensed frequency band of the frequency band from 52.6 GHz to 71 GHz to a terminal 10 that only supports the operation in the licensed frequency band of the frequency band from 52.6 GHz to 71 GHz.

(Device Configuration)

Next, a functional configuration example of the terminal 10 and the base station 20 which execute the above-described processing operations is described. The terminal 10 and the base station 20 are provided with all functions described in the embodiments. However, the terminal 10 and the base station 20 may be provided with partial functions among the all functions described in the embodiments. Note that, the terminal 10 and the base station 20 may be collectively referred to as a communication device.

<Terminal>

Figure 14:
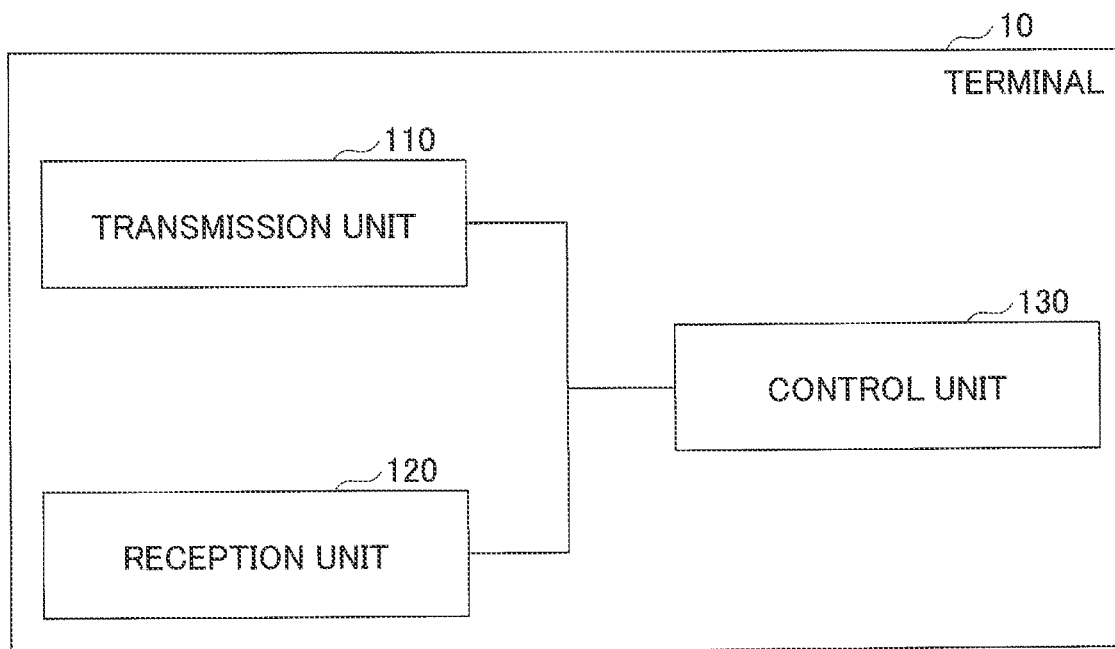
FIG. 14 is a diagram illustrating an example of a functional configuration of a terminal.

FIG. 14 is a diagram illustrating an example of a functional configuration of the terminal 10. As illustrated in FIG. 14, the terminal 10 includes a transmission unit 110, a reception unit 120, and a control unit 130. The functional configuration illustrated in FIG. 14 is illustrative only. A functional division and the names of the functional units may be any division and name as long as the operation according to the embodiments can be executed. Note that, the transmission unit 110 may be referred to as a transmitter, and the reception unit 120 may be referred to as a receiver.

The transmission unit 110 creates transmission from transmission data, and wirelessly transmits the transmission signal. The transmission unit 110 may form one or a plurality of beams. The reception unit 120 wirelessly receives various signals, and acquires a signal of a higher layer from a received physical layer signal. In addition, the reception unit 120 includes a measurement unit that performs measurement of a signal that is received to obtain received power or the like.

The control unit 130 performs control of the terminal 10. Note that, a function of the control unit 130 which relates to transmission may be included in the transmission unit 110, and a function of the control unit 130 which relates to reception may be included in the reception unit 120.

For example, in the frequency band from 52.6 GHz to 71 GHz, at the time of an initial access, the reception unit 120 of the terminal 10 receives system information including PRACH configuration information from the base station 20. The control unit 130 of the terminal 10 selects an orthogonal sequence applicable to the PRACH format based on a parameter specified by the information element prach-RootSequenceIndex included in the received PRACH configuration information. Furthermore, the control unit 130 of the terminal 10 configures a subcarrier spacing for PRACH and configures a subcarrier spacing for PUSCH based on the PRACH configuration information included in the received system information. The transmission unit 110 of the terminal 10 applies the PRACH format and the subcarrier spacing for PRACH selected by the control unit 130, and transmits a random access preamble to the base station 20.

For example, in the frequency band from 52.6 GHz to 71 GHz, at the time of an initial access, the reception unit 120 of the terminal 10 receives system information including PRACH configuration information from the base station 20. The control unit 130 of the terminal 10 configures a PRACH configuration associated with the value of a PRACH configuration index based on the value of the PRACH configuration index included in the received PRACH configuration information, and the transmission unit 110 transmits a random access preamble to the base station 20. Here, the PRACH configuration associated with the value of the PRACH configuration index may be any of Alt. B1 to Alt. B3.

<Base Station 20>

Figure 15:
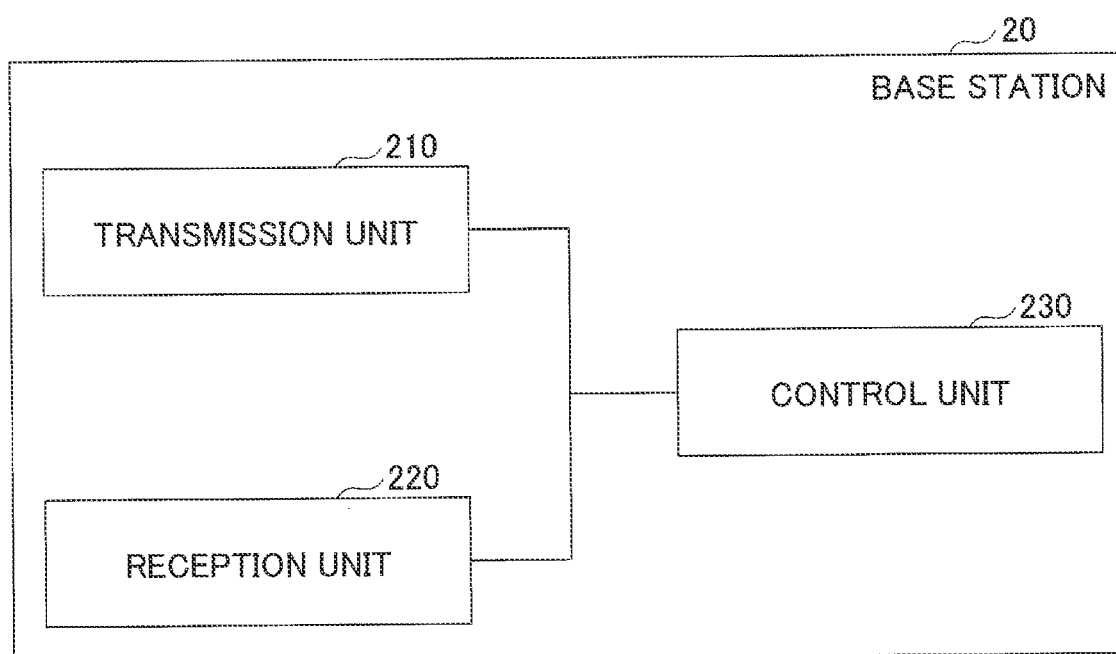
FIG. 15 is a diagram illustrating an example of a functional configuration of a base station.

FIG. 15 is a diagram illustrating an example of a functional configuration of the base station 20. As illustrated in FIG. 15, the base station 20 includes a transmission unit 210, a reception unit 220, and a control unit 230. A functional configuration illustrated in FIG. 15 is illustrative only. A functional division and the names of the functional units may be any division and name as long as the operation according to the embodiments can be executed. Note that, the transmission unit 210 may be referred to as a transmitter, and the reception unit 220 may be referred to as a receiver.

The transmission unit 210 includes a function of generating a signal to be transmitted to the terminal 10 side, and wirelessly transmitting the signal. The reception unit 220 includes a function of receiving various signals transmitted from the terminal 10, and acquiring, for example, information of a higher layer from the received signals. In addition, the reception unit 220 includes a measurement unit that performs measurement of a signal that is received to obtain received power or the like.

The control unit 230 performs control of the base station 20. Note that, a function of the control unit 230 which relates to transmission may be included in the transmission unit 210, and a function of the control unit 230 which relates to reception may be included in the reception unit 220.

For example, in the frequency band from 52.6 GHz to 71 GHz, the control unit 230 of the base station 20 includes a parameter for specifying a candidate for an orthogonal sequence applicable to the PRACH format in the information element prach-RootSequenceIndex, and transmits system information including the PRACH configuration information such as the prach-RootSequenceIndex to the terminal 10. The reception unit 220 of the base station 20 applies a subcarrier spacing for PRACH and a subcarrier spacing for PUSCH specified by the control unit 230 in the PRACH configuration information, and receives a random access preamble transmitted from the terminal 10.

For example, in the frequency band from 52.6 GHz to 71 GHz, the control unit 230 selects a PRACH configuration that is actually configured for the terminal 10 from among a plurality of PRACH configurations configurable for the terminal 10, and the transmission unit 210 transmits, to the terminal 10, system information including PRACH configuration information, such as a PRACH configuration index value corresponding to the PRACH configuration selected by the control unit 230. The reception unit 220 of the base station 20 receives a random access preamble transmitted from the terminal 10 based on the PRACH configuration selected by the control unit 230.

<Hardware Configuration>

The block diagrams (FIG. 14 and FIG. 15) which are used in description of the embodiments illustrate blocks in a functional unit. The functional blocks (components) are implemented by a combination of hardware and/or software. In addition, means for implementing respective functional blocks is not particularly limited. That is, the respective functional blocks may be implemented by one device in which a plurality of elements are physically and/or logically combined. In addition, two or more devices, which are physically and/or logically separated from each other, may be directly and/or indirectly connected (for example, in a wired manner and/or a wireless manner), and the respective functional blocks may be implemented by a plurality of the devices.

Figure 16:
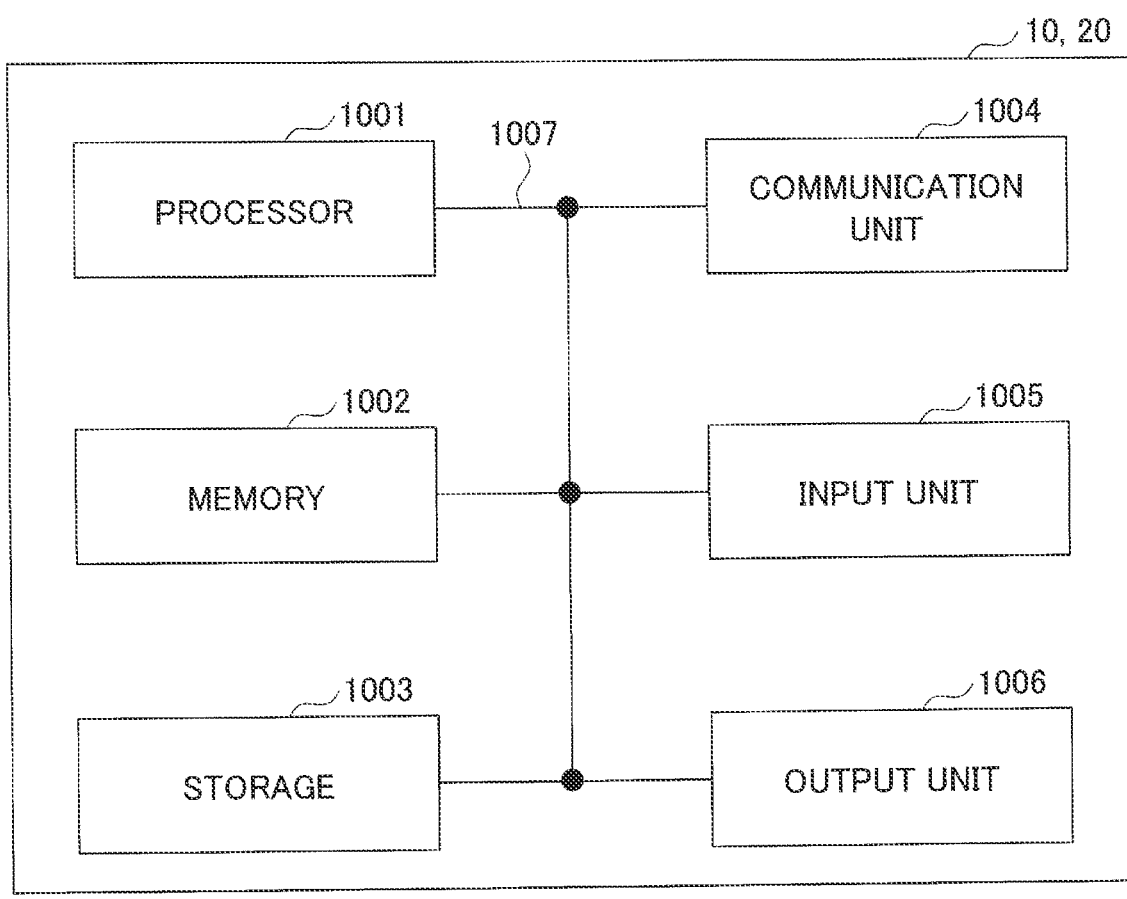
FIG. 16 is a diagram illustrating an example of a hardware configuration of the terminal and the base station.

For example, each of the terminal 10 and the base station 20 according to an embodiment of the present invention may function as a computer performing the process according to the embodiments. FIG. 16 is a diagram illustrating an example of a hardware configuration of the terminal 10 and the base station 20 according to the embodiments. Each of the above-described terminal 10 and base station 20 may be physically configured as a computer device including a processor 1001, a memory 1002, an storage 1003, a communication unit 1004, an input unit 1005, an output unit 1006, a bus 1007, and the like.

In the following description, the term "device" can be replaced with a circuit, a device, a unit, or the like. The hardware configuration of the terminal 10 and the base station 20 may include one or more of the devices denoted by 1001-1006 in the figure, or may be configured without some devices.

Each function of the terminal 10 and the base station 20 is implemented by loading predetermined software (program) on hardware, such as the processor 1001 and the memory 1002, so that the processor 1001 performs computation and controls communication by the communication unit 1004, and reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and the like.

Additionally, the processor 1001 reads a program (program code), a software module, or data from the storage 1003 and/or the communication unit 1004 to the memory 1002, and executes various processes according to these. As the program, a program is used that causes a computer to execute at least a part of the operations described in the above-described embodiments. For example, the transmission unit 110, the reception unit 120, and the control unit 130 of the terminal 10 illustrated in FIG. 14 may be implemented by a control program that is stored in the memory 1002 and that is operated by the processor 1001. Furthermore, for example, the transmission unit 210, the reception unit 220, and the control unit 230 of the base station 20 illustrated in FIG. 15 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, or the like, which can be executed for implementing the process according to one embodiment of the present invention.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and the like. The storage 1003 may be referred to as an auxiliary storage device. The above-described storage medium may be, for example, a database including the memory 1002 and/or the storage 1003, a server, or any other suitable medium.

The communication unit 1004 is hardware (transmitting and receiving device) for performing communication between computers through a wired network and/or a wireless network, and is also referred to, for example, as a network device, a network controller, a network card, a communication module, or the like. For example, the transmission unit 110 and the reception unit 120 of the terminal 10 may be implemented by the communication unit 1004. Furthermore, the transmission unit 210 and the reception unit 220 of the base station 20 may be implemented by the communication unit 1004.

The input unit 1005 is an input device (e.g., a keyboard, a mouse, a microphone, a switch, a button, and/or a sensor) that receives an external input. The output unit 1006 is an output device (e.g., a display, a speaker, and/or an LED lamp) that performs output toward outside. The input unit 1005 and the output unit 1006 may be configured to be integrated (e.g., a touch panel).

Each device, such as the processor 1001 and the memory 1002, is also connected by the bus 1007 for communicating information. The bus 1007 may be formed of a single bus or may be formed of different buses between devices.

The terminal 10 and the base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented by at least one of these hardware components.

Conclusion of the Embodiments

In the specification, at least the terminal and the base station described below are disclosed.

A terminal including a reception unit that receives configuration information in a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that configures at least one of a format of a random access preamble, a sequence of the random access preamble, a subcarrier spacing applied to a channel on which the random access preamble is to be transmitted, or a subcarrier spacing applied to an uplink shared channel, based on the configuration information.

According to the above configuration, the terminal can make a configuration related to the transmission of the random access preamble applicable to the high frequency band higher than or equal to the frequency band of the FR2.

A sequence length of the sequence of the random access preamble may be longer than or equal to a sequence length of the sequence of the random access preamble that is usable in an unlicensed frequency band of the FR2.

According to the above configuration, even if the transmission output of the terminal is regulated in the unlicensed frequency band in the high frequency band higher than or equal to the frequency band of the FR2 based on the upper limit of power spectrum density (PSD), the terminal can set higher total transmission power.

The subcarrier spacing applied to the channel for transmitting the random access preamble may be the same as the subcarrier spacing applied to the uplink shared channel.

According to the above configuration, the terminal can configure the subcarrier spacing applied to the channel for transmitting the random access preamble to be the same as the subcarrier spacing applied for transmitting the data.

The subcarrier spacing applied to the channel for transmitting the random access preamble may be different from the subcarrier spacing applied to the uplink shared channel.

According to the above configuration, the terminal can configure the subcarrier spacing applied to the channel for transmitting the random access preamble to be different from the subcarrier spacing applied for transmitting data.

A base station including a control unit that configures configuration information including at least one of a format of a random access preamble, a sequence of the random access preamble, a subcarrier spacing applied to a channel on which the random access preamble is to be transmitted, or a subcarrier spacing applied to an uplink shared channel configurable for a terminal in a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a transmission unit that transmits the configuration information to the terminal.

According to the above configuration, the base station can transmit, to the terminal, information regarding the configuration of the random access preamble applicable to the terminal in the high frequency band higher than or equal to the frequency band of the FR2.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 10 and the base station 20 are described using the functional block diagrams, but such devices may be implemented by hardware, software, or a combination thereof. Software executed by the processor included in the terminal 10 according to the embodiments of the present invention and software executed by the processor included in the base station 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present specification and may be provided by any other method. For example, the notification of information may be provided by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present specification may be applied to Long Term Evolution (LTE), LTE-advanced (LTE-A), SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended based on these standards.

The processing procedures, the sequences, the flowcharts, and the like of the respective aspects/embodiments described in the present specification may be reversed in order provided that there is no contradiction. For example, the method described in the present specification presents elements of various steps with an exemplary order and is not limited to a presented specific order.

In the present specification, a specific operation to be performed by the base station 20 may be performed by an upper node in some cases. In the network including one or more network nodes including the base station 20, various operations performed for communication with the terminal 10 can be obviously performed by the base station 20 and/or any network node (for example, an MME, an S-GW, or the like is considered, but it is not limited thereto) other than the base station 20. A case is exemplified above in which there is one network node other than the base station 20. The one network node may be a combination of a plurality of other network nodes (e.g., MME and S-GW).

The aspects/embodiments described in this specification may be used alone, in combination, or switched with implementation.

The terminal 10 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station 20 may be defined by those skilled in the art as a NodeB (NB), enhanced node B (eNB), base station, gNB, or several appropriate terminologies.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not be assumed that the UE transmits and receives a predetermined signal/channel outside an active BWP. Further, a "cell," a "carrier," or the like in the present disclosure may be replaced with a "BWP."

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology. The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like. The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology. The slot may include a plurality of mini slots. Each mini slot may include one or more symbols in the time domain. Furthermore, the mini slot may be referred to as a sub-slot. The mini slot may include fewer symbols than a slot. A PDSCH (or PUSCH) transmitted in a unit of time greater than a mini slot may be referred to as a PDSCH (or PUSCH) mapping type A. A PDSCH (or PUSCH) transmitted using a mini slot may be referred to as a PDSCH (or PUSCH) mapping type B. Any one of a radio frame, a subframe, a slot, a mini slot, and a symbol indicates a time unit for transmitting a signal. As a radio frame, a subframe, a slot, a mini slot, and a symbol, different names corresponding to them may be used. For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 10) to each terminal 10 in units of TTIs. The definition of the TTI is not limited thereto. The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI. When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled. A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like. Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology. Furthermore, a time domain of an RB may include one or more symbols and may be a length of one slot, one mini slot, one subframe, or one TTI. One TTI, one subframe, or the like may be formed of one or more resource blocks. Furthermore, one or more RBs may be referred to as a physical resource block (PRB: Physical RB), a sub carrier group (SCG: Sub-Carrier Group), a resource element group (REG: Resource Element Group), a PRB pair, an RB pair, or the like. Furthermore, the resource block may be formed of one or more resource elements (RE: Resource Element). For example, one RE may be a radio resource region of one subcarrier and one symbol.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The description "based on" in this specification does not represent "only based on" unless otherwise stated. In other words, description of "based on" represents both "only based on" and "at least based on."

In this specification or the appended claims, in a case where "include," "including," and a modification thereof are used, these terms are intended as comprehensive terms similar to "comprising." In addition, a term "or" that is used in this specification and the appended claims is not intended as an exclusive OR.

In the entire present disclosure, for example, when an article such as "a," "an," and "the" in English is added by a translation, the article may include multiple things, unless the context explicitly indicates that the article does not include the multiple things.

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS

10 terminal
110 transmission unit
120 reception unit
130 control unit
20 base station
210 transmission unit
220 reception unit
230 control unit
1001 processor
1002 memory
1003 storage
1004 communication device
1005 input device
1006 output device

The invention claimed is:

1. A terminal comprising:
a controller configured to generate a random access preamble for a frequency band higher than or equal to a predetermined frequency in a radio communication system; and
a transmitter configured to transmit the random access preamble by using a preamble format,
wherein the frequency band is a frequency range from 52.5 GHz to 71 GHZ,
wherein the transmitter transmits capability information of the terminal, the capability information indicating a subcarrier spacing and a sequence length applicable to the random access preamble in the frequency range from 52.5 GHz to 71 GHZ,
wherein the subcarrier spacing is applied to the preamble format, and
wherein the controller is configured to generate the random access preamble based on the sequence length.

2. The terminal according to claim 1, wherein the subcarrier spacing is a subcarrier spacing that is greater than or equal to 120 kHz.

3. The terminal according to claim 1, wherein the subcarrier spacing includes a subcarrier spacing of 480 kHz.

4. The terminal according to claim 1, wherein an index of the sequence length is 139, 571, or 1151.

5. A base station comprising:
- a transmitter configured to transmit, to a terminal, information indicating a preamble format used for a transmission of a random access preamble in a frequency band higher than or equal to a predetermined frequency in a radio communication system; and
- a receiver configured to receive the random access preamble that is transmitted from the terminal by using the preamble format in the frequency band higher than or equal to the predetermined frequency,
- wherein the frequency band is a frequency range from 52.5 GHz to 71 GHz,
- wherein the receiver receives capability information of the terminal, the capability information indicating a subcarrier spacing and a sequence length applicable to the random access preamble in the frequency range from 52.5 GHz to 71 GHZ,
- wherein the subcarrier spacing is applied to the preamble format, and
- wherein the random access preamble is generated based on the sequence length.

6. A communication method executed by a terminal, the method comprising:
- generating a random access preamble for a frequency band higher than or equal to a predetermined frequency in a radio communication system; and
- transmitting the random access preamble by using a preamble format,
- wherein the frequency band is a frequency range from 52.5 GHz to 71 GHZ,
- wherein the terminal transmits capability information of the terminal, the capability information indicating a subcarrier spacing and a sequence length applicable to the random access preamble in the frequency range from 52.5 GHz to 71 GHZ,
- wherein the subcarrier spacing is applied to the preamble format, and
- wherein the generating generates the random access preamble based on the sequence length.

7. A radio communication system comprising:
- a base station configured to transmit information indicating a preamble format used for transmitting a random access preamble; and
- a terminal configured to
  - generate a random access preamble for a frequency band higher than or equal to a predetermined frequency in a radio communication system; and
  - transmit the random access preamble by using a preamble format,
  - wherein the frequency band is a frequency range from 52.5 GHz to 71 GHz,
  - wherein the terminal is configured to transmit capability information of the terminal, the capability information indicating a subcarrier spacing and a sequence length applicable to the random access preamble in the frequency range from 52.5 GHz to 71 GHz,
- wherein the subcarrier spacing is applied to the preamble format, and
- wherein the terminal is configured to generate the random access preamble based on the sequence length.

* * * * *